No. 650,609. Patented May 29, 1900.
C. R. OTIS.
CONTROLLING LEVER FOR MOTOR CARRIAGES.
(Application filed Apr. 2, 1900.)
(No Model.)
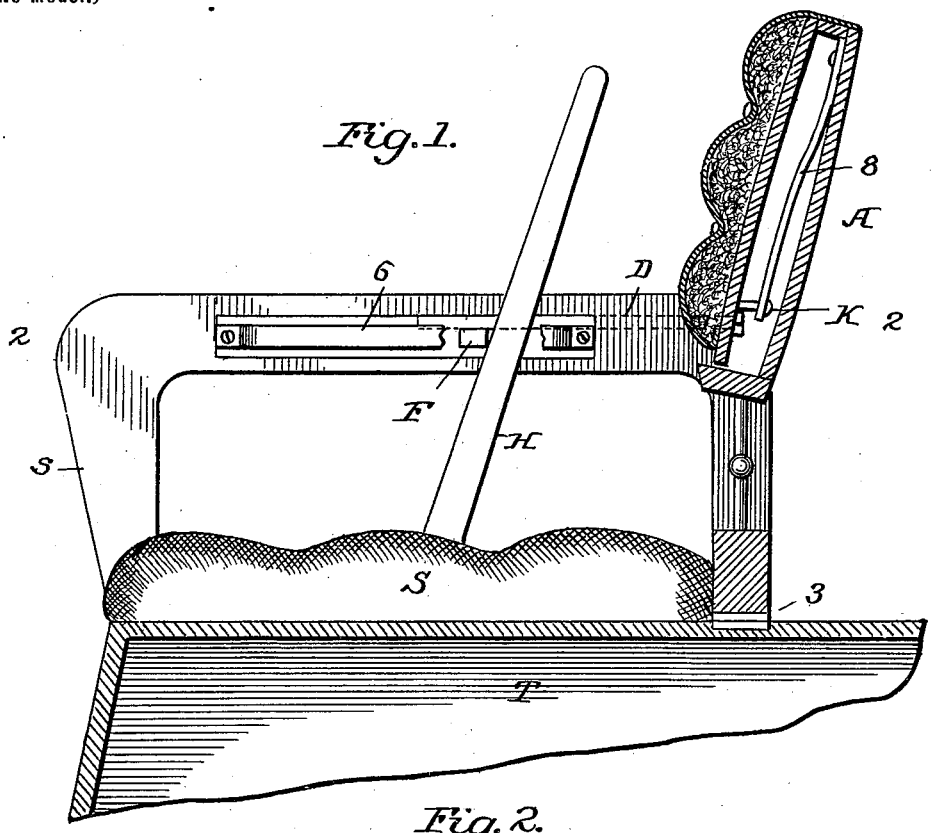
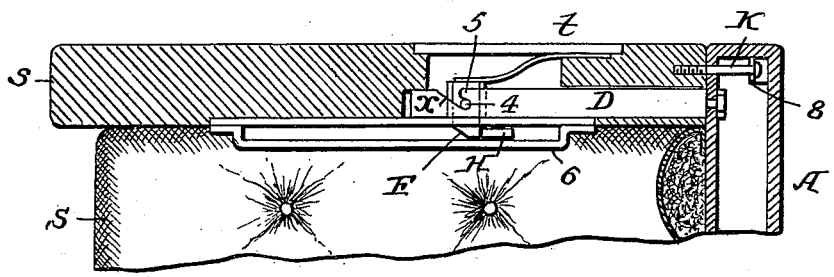
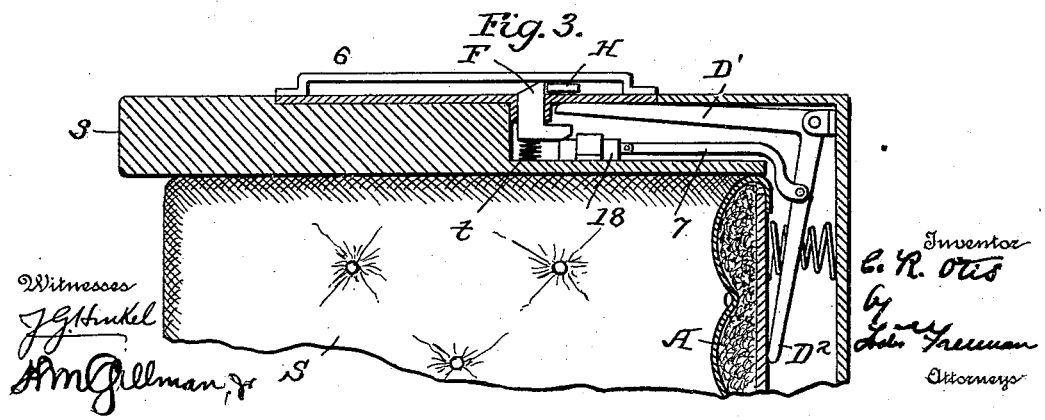
Witnesses
Inventor
C. R. Otis
Attorneys
THE NORRIS PETERS CO., PHOTO-LITHO., WASHINGTON, D. C.

UNITED STATES PATENT OFFICE.

CHARLES R. OTIS, OF YONKERS, NEW YORK.

CONTROLLING-LEVER FOR MOTOR-CARRIAGES.

SPECIFICATION forming part of Letters Patent No. 650,609, dated May 29, 1900.

Application filed April 2, 1900. Serial No. 11,141. (No model.)

*To all whom it may concern:*

Be it known that I, CHARLES R. OTIS, a citizen of the United States, residing at Yonkers, in the county of Westchester and State of New York, have invented certain new and useful Improvements in Controlling-Levers for Motor-Carriages, of which the following is a specification.

My invention relates to that class of apparatus for propelling vehicles which embodies a motor and control device of any suitable character; and my invention consists in combining with the actuating-lever of the control device a bolt or detent for holding it out of operation, together with means for retracting said bolt or detent by pressure against the back of the seat of the vehicle, as fully set forth hereinafter and as illustrated in the accompanying drawings, in which—

Figure 1 is an elevation in section of the seat of a vehicle, showing the control-lever, bolt, and bolt locking and unlocking devices. Fig. 2 is a section on the line 2 2, Fig. 1. Fig. 3 is a sectional plan illustrating a modification of the devices for controlling the action of the detent or bolt.

The body T of the vehicle is of any suitable construction and is provided with a seat S, which preferably has side arms s and a back A.

The vehicle is provided with any suitable motor—steam, electric, compressed-air, or other form—and this motor is under the control of a hand-lever H, which preferably extends at one side of the seat upward, so as to be readily grasped by the hand. As is well known, numerous accidents have occurred from the drivers of motor-vehicles being obliged to leave the same where unauthorized persons could get access to the operating-levers, and I therefore combine with the operating-lever a bolt or detent F, preferably having a beveled or inclined end or face against which the lever is brought when it is drawn backward to close the valve or other control device, whereby the bolt or detent is forced inward, and a spring $t$ thereafter forces the bolt outward in front of the lever and locks the same in its retracted position. If the bolt and its operating appliances were accessible, they might readily be displaced by any malicious person desiring to start the machine. I therefore provide means whereby the bolt is held securely in its place, so that it cannot be displaced except by the pressure of the driver against the back of the seat. Various appliances may be employed whereby this result can be secured.

As shown in Fig. 1, the back of the seat A is movable, being hinged at 3, and a spring 8 tends to throw the back forward against a contact-face upon one of the arms $a$. Into a recess in the arm through which extends the bolt F also extends the bolt-shifting device, consisting, as shown, of a plate D, having an inclined face $x$, which as the plate is drawn back bears upon a pin 4, projecting from the bolt, and moves the latter back out of the way of the lever H. The plate D also has a lip 5, which when the plate is in its forward position is behind the pin 4, so that the bolt is held in its projected position and cannot be forced backward by pressure applied to the end of the bolt, which projects in front of the lever H. A guard 6 extends along the inner side of the arm $s$ and serves to guard the end of the bolt and also to guide the hand-lever H in its movement. A spring is arranged so as to throw the back A of the seat forward. As shown, this spring 8 is arranged within the back of the seat and bears at its lower end upon the head of a bolt K, projecting from the arm $s$, and the plate D is secured to this back, so that when the operator takes his position upon the seat and then leans backward he thereby draws back the plate D of the bolt-controlling device, and thus causes the shifting of the bolt out of the way of the lever. As these parts are concealed, any unauthorized person taking a position upon the seat of the vehicle will naturally lean forward in his effort to force back the bolt F, so that the latter will remain securely locked in place.

Where it is not desirable to move back the entire back of the seat, the control device may be provided with an arm which extends into the back and which is moved by the pressure of the operator in leaning backward. This construction is shown in Fig. 3, where instead of the plate D there is one arm D' of a lever, which bears upon a lug of the bolt, the other arm D² extending into the cushion of the seat in such position that it can be moved backward by the pressure of the operator as he leans against the back of the seat. In such case a block 18 is between the lug of the bolt F and the side of the opening in the arm and is connected by a rod 7 with the arm D², so that when the latter is forced backward the block 18 will be first moved away from back of the bolt F, which may then be retracted by the contact and swinging of the arm D'.

It is desirable to arrange the lever so that the throttle-valve or other control device may be fully opened or closed by a movement of the lever in front of the bolt F, so that when it is desired to lock the lever it is carried back beyond the position necessary to arrest the movement of the carriage. The bolt therefore does not interfere with or obstruct in any way the normal operations of the lever and only comes into action when the lever is drawn beyond the point necessary to close the valve or other control device, which as ordinarily constructed can have a slight additional movement after being closed not affecting the operations of the machine.

Without limiting myself to the precise arrangement and construction of parts shown, I claim as my invention—

1. The combination with the seat and operating-lever of a motor-vehicle, of a detent arranged to engage the lever, and means for retracting the detent by the pressure of the body of the operator against the back of the seat, substantially as set forth.

2. The combination with the seat and operating-lever of a motor-vehicle, of a detent arranged to engage the lever when the latter is moved beyond the extent required to close the valve, and means for retracting the detent by the pressure of the body of the operator against the back of the seat, substantially as set forth.

3. The combination with the seat and operating-lever of a motor-vehicle, of a bolt or detent for locking the lever, a movable back, and connections between the latter and the detent for withdrawing the detent on the application of pressure to the back, substantially as set forth.

4. The combination of the seat and operating-lever of a motor-vehicle, a movable back to said seat, a detent for engaging the lever, and connections between the detent and back arranged to withdraw the detent on the backward movement of the back, substantially as set forth.

5. The combination of the seat and operating-lever of a motor-vehicle, a movable back to said seat, a spring for throwing the back forward, a detent for engaging the lever, and connections between the detent and back arranged to withdraw the detent on the backward movement of the back, substantially as set forth.

6. The combination of the seat and operating-lever of a motor-vehicle, a movable back to said seat, a detent for engaging the lever, a spring for throwing the detent into a locking position, and connections between the detent and back arranged to withdraw the detent on the backward movement of the back, substantially as set forth.

7. The combination with the seat and operating-lever of a motor-vehicle, of a bolt with a beveled end arranged to be pushed in by contact with the lever, a spring throwing the bolt into locking position, and a lever connected to move said bolt and having one arm within and arranged to be moved by pressure upon the back of the seat-back, substantially as set forth.

8. The combination with the seat and operating-lever of a motor-vehicle, of a detent for holding the lever in its retracted position to close the valve, and a lever concealed in the back of the seat and connected to shift the detent on pressure against the back of the seat, substantially as set forth.

9. The combination with the seat and operating-lever of a motor-vehicle, of a detent for holding the lever in its retracted position to close the valve, a lever concealed in the back of the seat and connected to shift the detent on pressure against the back of the seat, and means for locking the detent in its forward position connected to be shifted by pressure against the back of the seat, substantially as set forth.

In testimony whereof I have signed my name to this specification in the presence of two subscribing witnesses.

CHAS. R. OTIS.

Witnesses:
MARY S. ALEXANDER,
JOHN W. ALEXANDER.